INVENTOR.
ROBERT L. MALONE
BY
Christie, Parker & Hale
ATTORNEYS

INVENTOR.
ROBERT L. MALONE
BY
Christie, Parker & Hale
ATTORNEYS.

United States Patent Office 3,444,358

Patented May 13, 1969

3,444,358
RECORD READER

Robert Lee Malone, Palos Verdes Peninsula, Calif., assignor to Ex-Cell-O Corporation, Detroit, Mich., a corporation of Michigan Filed May 14, 1965, Ser. No. 455,798
Int. Cl. G06k 7/00
U.S. Cl. 235—61.11 4 Claims

ABSTRACT OF THE DISCLOSURE

Record reader for optically reading recorded information marks including sensing of the optical properties of the record member per se. The record reader includes circuit means for responding to the electrical signals produced from reading the record member including modification of the read-out signals in accordance with the sensed optical properties of the record member.

This invention relates to a record reader and, more particularly to improvements in the construction of an optical readout device for use with record members having light transmitting marks.

A common form of record member for use in digital control arrangements and the like is a tape whereon binary coded information may be recorded by means of marks, including marks having preselected optical characteristics. A specific form of record member that has been employed in numerical control arrangements for machine tools is a perforated tape wherein the binary information is recorded in terms of the presence or absence of perforations to thereby provide an on-off type of output indication. For these types of record members, the record member or tape may have varying light transmitting properties depending on the type of material employed for the "paper tape." These "paper tapes" range from the opaque, aluminum Mylar tape to the pure paper tapes having varying degrees of light transmitting properties. The binary coded information is recorded on these tapes by means of punches and it has been found that when the opaque or aluminum Mylar tape is employed, the life of the punch is more limited than when purely paper tapes are used. Accordingly, in more and more applications the record members or the "paper tapes" are comprised of pure paper tapes having varying degrees of light transmitting properties and more particularly highly transparent tapes. Although the use of the purely paper tape extends the life of the tape punch, the fact that a tape is highly transparent introduces problems for correctly reading the transparent tapes and the problems increase with the increasing light transmitting properties of the tape.

In general, the problems with regard to the transparent tapes involve the accurate reading or discrimination of the recorded information marks by the optical readout element relative to the detected light transmitted through the tape per se. The discrimination of the information marks has been improved through the controlled reading of the information marks by means of electronic techniques. One such technique of the prior art utilizes the sprocket or feed holes of the conventional paper tape as a timing track signal to condition the readout circuitry to provide information signals only during the intervals that a corresponding timing signal exists. One specific arrangement of this technique is disclosed in the copending application bearing Ser. No. 78,747, filed on Dec. 27, 1960, and now United States Patent No. 3,198,935 granted on August 3, 1965, and entitled "Record Reader" and assigned to the same assignee as the present application. This technique, being an electrical technique, does not completely compensate or control the reading problems resulting from the physical arrangement of the reading elements and record member; such as the light scattering effect of the light rays that impinge on the optical readout element, particularly when tapes having high transparencies are employed. There is a present need, then, to provide an optical-mechanical arrangement of a record member to be read, light source and sensors to provide a high degree of sensitivity to the recorded perforations and yet to control and channel the light rays while minimizing the light scattering effect of the tape to provide the desired useful electrical output indications from the sensor when tapes having high transparencies are employed.

The present invention provides an improved readout arrangement for paper tapes having varying light transmitting properties and including paper tapes having very high transparencies. The present invention advantageously combines, in an economical fashion, an electrical-optical-mechanical arrangement for distributing and collecting light rays into equal light "pieces" to provide the correct output indications from a record member or tape having a high transparency photo-electric sensor is further defined to detect the optical properties or the light transmitting properties of the record member per se and provide an output indication thereof that is employed to modify the timing of the reading interval to compensate for the detected light transmitting properties of the tape.

Specifically, the present invention provides a readout device for reading paper tapes of varying light transmitting properties wherein a light distributor mounting a plurality of light transmitting elements, such as fiber optical elements, channel and guide light from a light source into equal light "pieces" for impingement on the tape or record member that is mounted to be maintained immediately adjacent the light exit side of the light distributing element. The light distributing element is further characterized as having fiber optical elements that are clad and have a preselected angle of light admittance and exit. The optical readout element itself is arranged in a spaced relationship with the record member to increase the transparency rejection of the light "pieces" received from the record member. This is further enhanced by the provision of dark wall light transmitting columns arranged in alignment with the pattern of recorded information marks on the record member and the light channels of the distributor for transmitting essentially all of the individual light "pieces" received by means of an information mark to an individual sensor.

In another aspect of the invention, the light sensor which may be in the form of a photo-voltaic cell includes at least a single sensing element that is arranged to receive light directly transmitted through the record member from an area related to the information bearing area of the record member to detect the optical properties or the quantity of light that is transmitted directly through the record member per se. The output indication provided by this sensing means is utilized to modify the switching time of the timing circuit that is responsive to the output indication corresponding to the feed holes in the conventional paper tape. Specifically, the transparency output signal is utilized to subtract from the available switching current coupled to the timing circuit, in accordance with the sensed transparency of the record member and thereby provide a timing output indication that is compensated for controlling the information signals derived from the information marks.

These and other features of the present invention may be more fully appreciated when considered in the light of the following specifications and drawings in which.

Figure 1:
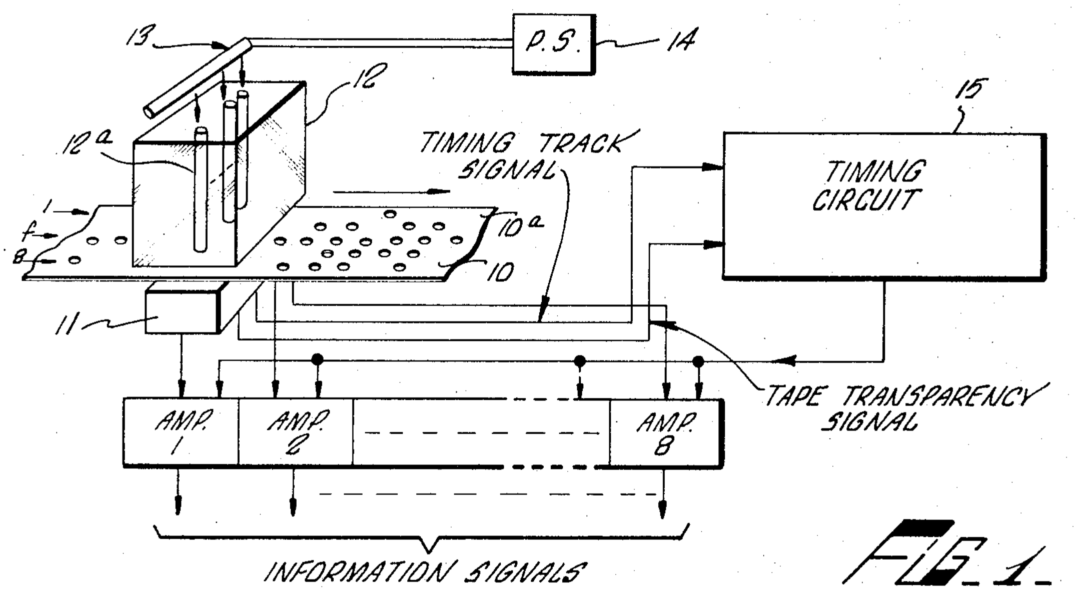
FIG. 1 is a diagrammatic illustration of the record reader embodying the invention.

Now referring to the drawings, the general organization of the record reader will be described. The record member is shown as a conventional paper tape 10 having the information bearing marks recorded thereon in terms of binary coded perforations, such as the perforations 10$^a$, illustrated on the tape 10. These information marks, or perforations 10$^a$, of course, are to be sensed and detected to provide corresponding electrical information signals.

In accordance with the concept of the present invention, the record member 10 is optically sensed by means of a photo-electric sensor 11 mounted on one side of the record member and in a spaced relationship therewith. Mounted on the opposite side and in intimate contact with the record member 10 is a light distributor 12 that receives light rays from the light source 13 and channels and guides the light rays into individual "pieces" corresponding to the number of columns provided for the record member. In this fashion the distributed light pieces may be transmitted through the perforations 10$^a$ and impinge on the sensor 11.

A conventional paper tape has eight information bearing columns and is generally provided with a feed hole arranged in an individual column intermediate the outside information columns and functioning as a timing track. For this purpose, each piece of binary coded information is arranged in a single row and each row includes a feed hole or timing signal.

The light rays may be provided by a light source 13 having an elongated, cylindrical configuration that is coextensive with the light distributor 12 and is energized from the power source 14 connected thereto, as is conventional. The light distributor 12 accepts the light rays from the source 13 and channels and guides these light rays onto the plurality of corresponding information columns of the record member 10 through the provision of light transmitting channels which are defined therein and controlled to have a preselected angle of admittance. These light transmitting channels function to break up the light rays into equal light "pieces" and transmit the "pieces" to the record member 10. For this purpose, the light transmitting channels may comprise optical fiber elements. The optical fiber elements of the light distributor 12 are identified by the reference character 12$^a$ and are shown in vertical alignment with the information columns of the paper tape 10 to channel the light "pieces" directly thereto. The light propagates through the fiber optical bundles by a series of reflections, from wall to wall only when the rays enter the fiber at a small enough angle to cause total reflection from wall to wall. For the purposes of reading a conventional eight column paper tape, an angle of admitttance of the order of twenty-six degrees has been found to be satisfactory. As is also known in the fiber optical art, in order to prevent cross talk between the fiber optical elements 12$^a$, it is necessary to insulate them from each other by means of a thin jacket of transparent material whose index of refraction is lower than that of the fibers. This insulation is generally referred to as cladding. An additional thin layer of dark absorbing coating may be also added over the cladding to further increase contrast and absorb scattered light. A more comprehensive discussion of the general principles of fiber optics may be had by reference to the article entitled "Fiber Optics for Electronics Engineers" by G. V. Novotny appearing in "Electronics" for June 1, 1962, on pages 35 through 42. It will be further appreciated from reviewing this publication that, although the light source and fiber optical bundles or light distributor are arranged in vertical alignment, that the fiber optical elements may be mounted or housed at any desired angle to channel and guide the light. For this purpose, the light source 13 may be positioned adjacent the light distributor 12 to direct the light rays in a plane parallel to the record member and the light channeling elements function to rotate the light through an angle to guide the light rays onto the perforated tape 10.

The photo-electric sensor 11 is of generally conventional construction and includes a separate photo-electric element for sensing each of the information columns, the eight columns on the record member 10, in addition to an individual element for detecting the column for the feed or timing perforations to generate a timing signal as in the prior art. For this purpose, the timing signal is applied to a timing circuit or trigger circuit having two states and capable of being switched from one state to the other state in response to the timing signal. The output signal from the timing circuit 15 is applied to each of the information amplifiers, shown in block form as the amplifier 1 through 8, to condition the amplifiers and cause them to conduct only when a timing signal is present in combination with a signal representative of a detected information mark or perforation. For this purpose, each of the individual photoelectric elements for an information column have their output signal connected directly to one of the information amplifiers 1 through 8. The more detailed arrangement of this timing circuit and information amplifier combination is disclosed in the aforementioned copending patent application bearing Ser. No. 78,747.

An important feature of the present invention is that the photo-electric sensor 11 includes means for detecting the optical properties or the transparency of the record member 10. The detailed arrangement for sensing the optical property of the record member 10 will be described hereinafter. Suffice is to say for the present that a signal is provided by the photo-electric sensor 11 in response to light impinging directly on a transparency sensing element that receives its light by means of light transmitted through the record member 10 per se. This output signal is identified as a tape transparency signal in FIG. 1 and is coupled to the timing circuit 15 to modify the switching action thereof, in accordance with the optical properties or the transparency of the record member.

With the above general organization of the record reader in mind, the detailed construction of the photo-electric sensor 11 and its coaction with the light distributor 12 and the record member 10 will now be explained, with particular reference to FIG. 3. For this purpose, the general construction of the light distributor 12 is illustrated as including a housing mounting a plurality eleven, fiber optical clad rods 12$^a$ arranged in a spaced apart relationship in accordance with the spacing of the information columns of the record member 10 and the feed or timing track column. In addition, for purposes of sensing the optical properties or the transparency of the record member 10, a pair of fiber optical clad elements are provided on opposite sides of the fiber rod for the feed hole or timing track and which feed hole light channeling element is identified by the reference character 12$^{a-f}$. In the same fashion, the transparency light channeling elements are identified by the reference numeral 12$^{a-T}$. The information column channeling elements are identified by the reference numeral 12$^a$. The light distributor 12 may mount these fiber optical elements by means of a potting technique or any other conventient conventional arrangement. The important aspect of the light channeling elements is that they be capable of accepting the light rays at the established angle of admittance and transmit the accepted light rays as light "pieces" to impinge on the record member 10 and thence directly onto the photo-electric sensor 11 when an information mark is aligned therewith. For this purpose, it has been found that the fiber optical bundles or clad rods for the information columns may have a diameter on the order of 0.030 inch.

Another important aspect of the present invention is the physical relationship of the photo-electric sensor 11 relative to the light distributor 12 and the record member 10. In any photo-electric or optical detector for an information bearing record member it is desirable to provide not only an output signal corresponding to each detected information mark on the record member, but also the output signal must have the desired electrical wave shape to be processed by the electrical circuits operating therewith. For this purpose, it desirable to provide an output signal in the general form of a square output waveform, even when the optical characteristic of the record member per se, is highly transparent. For this purpose, the length of time that the information amplifier circuits are placed in a conductive condition is also important and in the past special optical techniques and arrangements were resorted to provide the desired waveform for the electrical signal.

Figure 3:
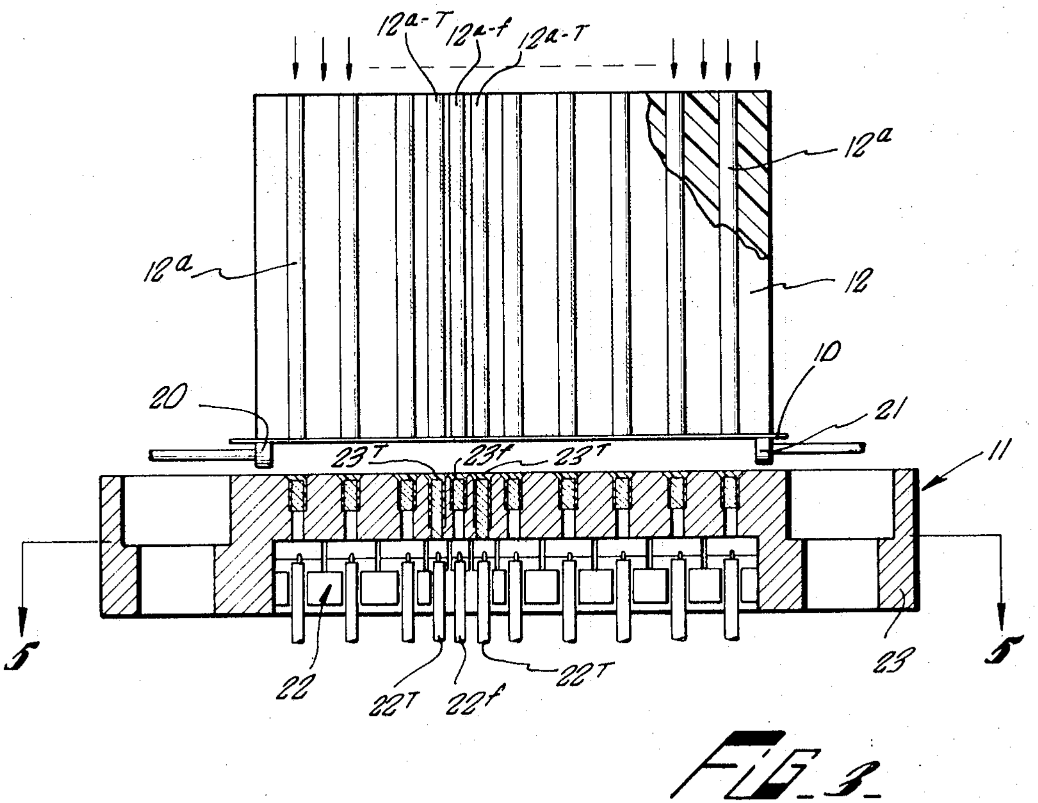
FIG. 3 is a cross-sectional view of the combination of the light distributor and readout element with a record member in a reading position.
Figure 5:
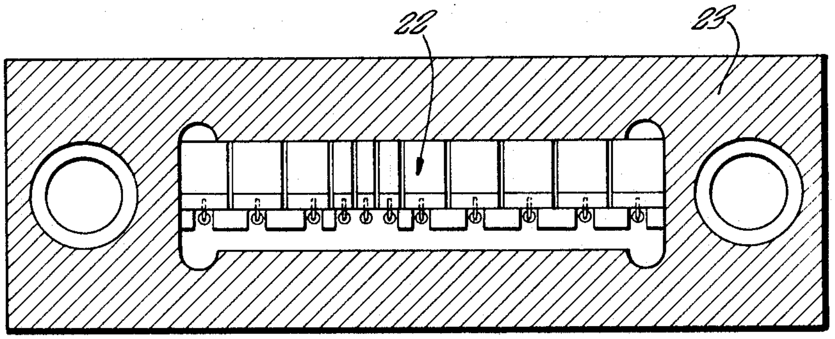
FIG. 5 is a cross-sectional view of the readout element taken along the line 5—5 of FIG. 3.

In accordance with the present invention, the output waveform is controlled through the maintaining of the record member 10 in intimate engagement with the light exit end of the light distributor 12 or the bottom side thereof, as illustrated in FIG. 3, and in a spaced relationship with the sensor 11. The record member 10 may be maintained in this position by any conventional arrangement for biasing the record member 10 in an abutting relationship with the light distributor 12 and exemplary arrangement is illustrated in FIG. 3. To this end, a pair of rollers 20 and 21 are mounted adjacent the outer edges of the record member 10 to maintain the record member in intimate engagement with the light distributor 12 and thereby be in a position to directly accept the light "pieces" from the light channeling elements and transmit them through a recorded perforation 10$^a$.

The important result of this relationship of record member and light distributor is that the photo-electric elements are turned on and off directly at the light exit end of the distributor leading to the production of a square output waveform.

The photo-electric sensor 11 employs a photo-voltaic cell 22 that is commercially available and provides an output signal in response to a light signal impinging on the active area thereof. The photo-voltaic cell 22, for the purposes of the present invention, includes the nine conventional separate elements for detecting and providing an output indication corresponding to each of the information columns and the feed or timing column. The feed hole sensor is identified by the reference numeral 22$^f$ and is arranged in vertical alignment with the light rod 12$^{a-f}$ for the light distributor 12. The photo-voltaic cell 22 is further provided with a pair of tape transparency sensing elements shown mounted on opposite sides of the timing or feed sensing elements 22$^f$ in FIG. 3 and which sensing elements are identified by the reference numeral 22$^T$. The action or operation of the photo-voltaic cell 22 for purposes of the present invention, are conventional except for the addition of the aforementioned cells.

The photo-voltaic cell 22 is mounted in a holder 23 and which holder includes light transmitting and collecting columns 23$^a$ for each individual element of the photo-voltaic cell 22 aligned with the light transmitting elements 12$^a$ to accept the light "pieces" transmitted through an information mark or perforation on the record member 10 to the corresponding individual active element comprising the photo-voltaic cell 22.

Figure 4:
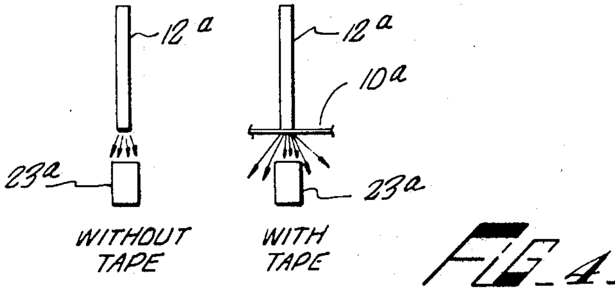
FIG. 4 is a diagrammatic illustration of the rejection technique for the light "pieces" transmitted through the record member as embodied in the invention.

To better appreciate the invention, at this point it may be well to examine the rejection technique upon which the construction of the photo-electric element 11 is based. This technique is exemplified by the diagrammatic illustration of FIG. 4. The light "pieces" derived from the record member 10 are defined and channeled by means of the optical rods 12$^a$ to transmit the light "piece" through the air space between the light exit end of the light distributor 12 directly into a light collecting column 23$^a$ provided for the photo-electric element 11 when no tape is positioned intermediate the light distributor 12 and the photo-electric element 11. The angles of entry into the collecting columns 23$^a$ for the light "pieces" from the light channeling elements 12$^a$, then, are defined to be the same angle of admittance for the light elements 12$^a$. For those skilled in the art, it will be appreciated that when the record member 10 is positioned intermediate the light distributor and the photo-electric element the bundle of rays emerging from the light distributor 12 will be scattered over a relatively wide angle due to the presence of the record member, as illustrated in FIG. 4. The controlled angle of admittance for these light collecting columns 23$^a$ prevents the transmission of the scattered light that does not fall within the controlled angle of admittance thereof.

It has also been found that the light channels 23$^a$ for the readout element 11 must not only be defined with the correct angle of admittance for these light pieces, but also must be defined as dark walled columns so as to prevent the entry of the light rays from an adjacent column to thereby impinge upon the adjacent photo-electric element.

The light holder, then, for this purpose, is defined with a corresponding plurality of light transmitting channels 23$^a$ that are characterized as dark walled columns. The dark walled columns are mounted in the holder 23 in vertical alignment with the light transmitting rods 12$^a$ for the light distributor 12 and in alignment with the individual active portions of the photo-voltaic elements comprising the photo-voltaic cell 22. For this purpose, the light collecting columns 23$^a$ mount a fiber element or a clad rod that also has a diameter on the order of 0.050 inch. In this fashion, the light "pieces" derived from the record member 10 are transmitted to the active element to minimize the effect of light scattering and thereby minimizing cross talk.

Figure 2:
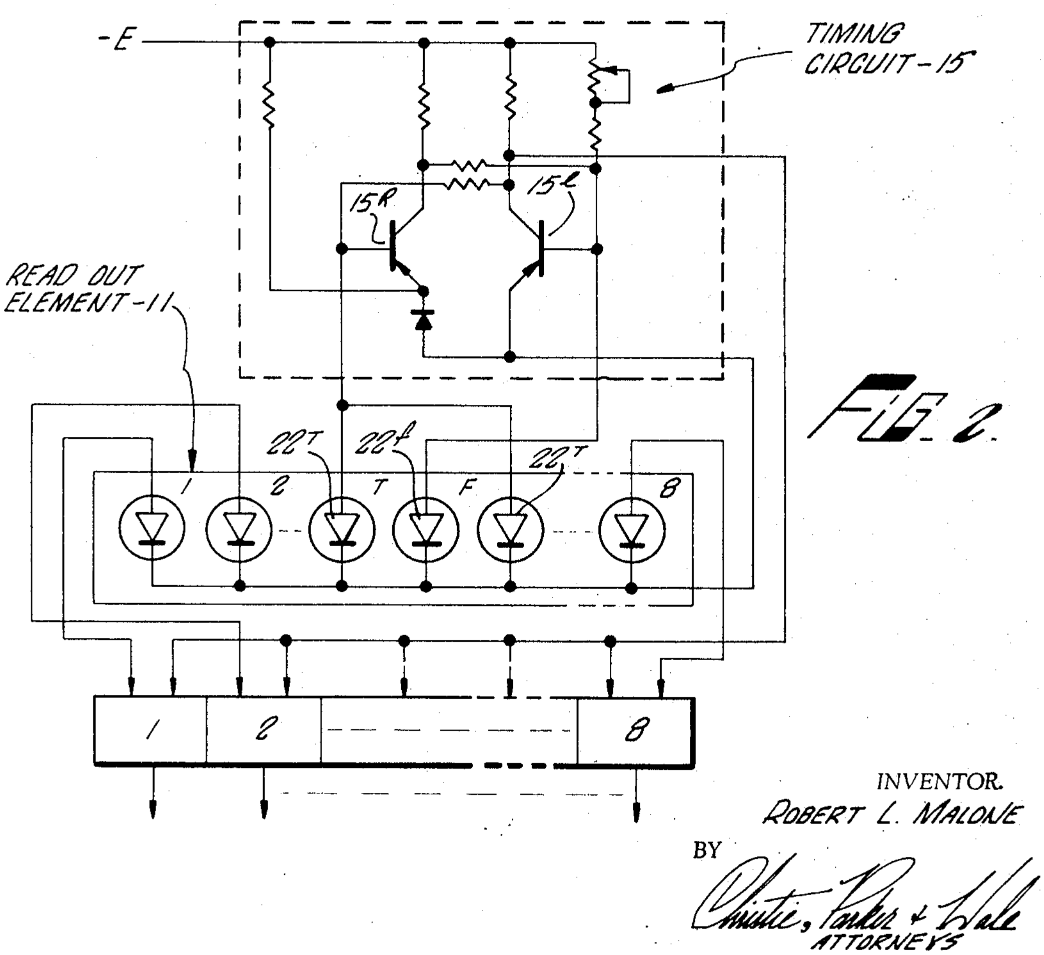
FIG. 2 is a schematic circuit diagram of the timing circuit for FIG. 1 and the combination with the readout element and information amplifiers.

With the above structure in mind, the circuit arrangement for modifying the operation of the timing circuit 15 in response to the tape transparency signals provided by the sensor 11 will now be described with reference to FIG. 2. The timing circuit 15 may be a conventional Schmitt trigger circuit to provide the timing signals to the information amplifiers 1 through 8, as best described in the aforementioned copending application bearing Ser. No. 78,747. Accordingly, when the Schmitt circuit is employed the switching action occurs due to the presence of a triggering signal at one of the input circuits having a preselected amplitude.

The timing circuit 15 is illustrated as a transistorized trigger circuit with a signal provided by the photo-voltaic element 22$^f$, corresponding to the feed or timing tract coupled directly to the base electrode of one of the transistors comprising the circuit 15. This transistor is illustrated as the left hand transistor 15$^l$. The transparency sensing elements 22$^T$ are shown in parallel circuit relationship with the base electrode of the other transistor, the transistor 15$^R$, for the Schmitt trigger. The provision of the output signals from the transparency sensors 22$^T$ results in coupling a current to the Schmitt circuit that subtracts from the switching current that is available for switching the state of the timing circuit 15 in response to the detection of a feed hole. The result is that the switching time of the timing circuit 15 will be modified or slowed down in accordance with the transparency properties of the record member 10. More specifically, the higher the transparency of the record member, the more current that is generated to slow down the switching of the trigger circuit 15 and thereby compensate for the light impinging on the sensing element that is derived directly from the record member per se.

The transparency sensors 22$^T$ are shown arranged on opposite sides of the feed hole for the record member 10 and thereby are integrally related with the information bearing areas of the record member whereby the signal provided by these transparency sensors are directly correlated to the detection of the information bearing marks on the record member. It will, of course, be appreciated that a single sensor may be employed for detecting transparency and may be arranged alongside an information column or any other convenient arrangement.

It should now be appreciated that the present invention provides an improved optical readout device that is capable of reading record members of varying light transmitting properties including highly transparent paper tapes.

What is claimed is:

1. A device for optically reading information marks recorded on a record member having preselected optical properties, said record member having a plurality of information marks arranged in columns and a column of timing marks for controlling the reading of the information marks, comprising individual means for optically reading the information and timing marks and providing an electrical output indication corresponding thereto, means for sensing the optical properties of the record member per se and providing an electrical output indication corresponding thereto, individual circuit means each connected to be conductively responsive to one of said individual means for reading the information marks for providing electrical output indications corresponding thereto, and timing circuit means connected to be switchably responsive to the timing mark output indication and connected to each of said circuit means for controlling the conductive response thereof, said timing circuit means being further connected to be responsive to the output indications from said sensing means for modifying the switching time thereof in response to the timing signals and thereby the conductive response of the individual circuit means.

2. A device for sensing light transmitted marks arranged in rows and columns on a record member having preselected light transmitting properties and providing output indications thereof, the record member having a preselected number of light transmitting information marks arranged in individual columns with the marks comprising a piece of information being arranged in the same row, the record member including a timing light transmitting mark arranged in an individual column and in alignment with each row of information, said readout device comprising a plurality of elements for individually producing electrical output indications in response to a light signal impinging thereon, one element for each information column and one element for the timing column of the record member to receive the light impinging thereon through the light transmitting marks aligned therewith, a pair of elements arranged on opposite sides of the timing column element to receive the light transmitted thereto directly through the record member to provide an output indication of the light transmitting properties of the record member, a plurality of information signalling circuits connected to be conductively responsive to the information signals to reproduce the pattern of information marks of a row, timing circuit means connected to be switchably responsive to the timing element output indication and to each of the information signalling circuits for controlling the conductivity thereof, said timing circuit means being further connected in a parallel circuit relationship with the output indications provided by said pair of elements to be responsive thereto for modifying the switching time thereof.

3. A device for sensing light transmitting marks as defined in claim 2 including clad fiber optical elements mounted adjacent each of the individual elements to transmit light thereto and spaced apart in accordance with the spacing of the information and timing columns and having a pair of clad fiber optical elements arranged adjacent the opposite sides of the timing column.

4. A readout device for sensing light transmitting marks arranged in rows and columns on a record member having preselected light transmitting properties and providing electrical output indications thereof, the record member having a preselected number of light transmitting information marks arranged in individual columns with the marks comprising a piece of information being arranged in the same row, the record member including a timing light transmitting mark arranged in an individual column and in alignment with each row of information, said readout device comprising a source of light, a light distributor mounting a plurality of light transmitting elements arranged in a spaced apart relationship in accordance with the spacing of the columns to channel and guide light from said source to the corresponding columns of a record member to be read, a plurality of elements arranged on the opposite side of a record member from the light distributor for individually producing electrical output indications in response to a light signal impinging thereon, one element for each information column and one element for the timing column of the record member to receive the light impinging thereon through the light transmitting marks aligned therewith, a pair of elements arranged on opposite sides of the timing column element to receive the light transmitted thereto directly through the record member to provide an output indication of the light transmitting properties of the record member, circuit means connected to be conductively responsive to the information output indications to electrically reproduce the recorded information marks, and timing circuit means connected to be responsive to the timing signal to control the conductivity of the circuit means in response to the information indications, said timing circuit means being further characterized as being responsive to the output indications of the pair of elements for modifying the conductive response thereof in accordance with the light transmitting properties thereof.

References Cited

UNITED STATES PATENTS

| | | | |
|---|---|---|---|
| 3,044,695 | 7/1962 | Burr et al. | 235—61.11 |
| 3,177,470 | 4/1965 | Galopin | 235—61.11 |
| 3,207,845 | 9/1965 | Swenson | 178—17 |
| 3,213,179 | 10/1965 | Clauson | 235—61.11 |
| 3,335,265 | 8/1967 | Apfelbaum et al. | 235—61.11 |

OTHER REFERENCES

Chomicki, J. S.: Optically Generated Timing Pulses. IBM Technical Journal, pp. 609, 610, vol. 7, No. 7, December 1964.

DARYL W. COOK, *Primary Examiner.*

U.S. Cl. X.R.

250—219